(12) United States Patent
Mathias et al.

(10) Patent No.: US 7,620,950 B2
(45) Date of Patent: Nov. 17, 2009

(54) SYSTEM AND METHOD TO MONITOR AMOUNT OF USAGE OF APPLICATIONS IN LOGICAL PARTITIONS

(75) Inventors: Thomas B. Mathias, Vestal, NY (US); Marcy J. Nechemias, Port Ewen, NY (US); Michael O. Tingey, Vestal, NY (US); Peter S. Wassel, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1364 days.

(21) Appl. No.: 10/613,779

(22) Filed: Jul. 1, 2003

(65) Prior Publication Data

US 2005/0004879 A1    Jan. 6, 2005

(51) Int. Cl.
*G06F 9/46* (2006.01)
*G07B 17/00* (2006.01)
*G07F 19/00* (2006.01)

(52) U.S. Cl. .................... 718/100; 718/104; 705/30
(58) Field of Classification Search .............. 718/1, 718/100, 104; 705/30, 32, 404; 726/7, 19
See application file for complete search history.

(56) References Cited

U.S. PATENT DOCUMENTS

| | | | | |
|---|---|---|---|---|
| 5,421,011 A | * | 5/1995 | Camillone et al. | 718/104 |
| 5,553,239 A | * | 9/1996 | Heath et al. | 726/2 |
| 5,778,182 A | * | 7/1998 | Cathey et al. | 709/219 |
| 5,825,883 A | * | 10/1998 | Archibald et al. | 705/53 |
| 5,930,773 A | * | 7/1999 | Crooks et al. | 705/30 |
| 6,618,709 B1 | * | 9/2003 | Sneeringer | 705/412 |
| 6,789,100 B2 | * | 9/2004 | Nemirovsky et al. | 718/107 |
| 6,986,137 B1 | * | 1/2006 | King et al. | 718/104 |
| 7,062,559 B2 | * | 6/2006 | Yoshimura et al. | 709/226 |

(Continued)

FOREIGN PATENT DOCUMENTS

EP    1217762 A2 *    6/2002

OTHER PUBLICATIONS

Smith et al., "Application service provider business model implementation on the iseries server", IBM redbooks, 2001, pp. 1-259.*

(Continued)

*Primary Examiner*—Meng-Ai An
*Assistant Examiner*—Caroline Arcos
(74) *Attorney, Agent, or Firm*—Yee & Associates, P.C.; Gerry Monteleone (57) ABSTRACT

A system, method, and program product for determining an amount of usage of applications in an LPAR in a computer system and a bill for such usage. A guest operating system or other program executing in the LPAR determines information indicative of an amount of usage of each of the applications. Based on the information, an amount of usage of each of the applications is reported to a billing function. The billing function determines a bill for each of the applications based on the amount of usage of each of the applications. The total usage of all of the applications is determined and compared to an amount of usage of the LPAR based on the system data, to audit the amount of usage of the applications in the LPAR or a charge based on the amount of usage of the applications.

12 Claims, 10 Drawing Sheets

U.S. PATENT DOCUMENTS

| | | | |
|---|---|---|---|
| 7,096,469 B1* | 8/2006 | Kubala et al. | 718/100 |
| 2001/0034736 A1* | 10/2001 | Eylon et al. | 707/200 |
| 2001/0044705 A1* | 11/2001 | Vardi et al. | 702/186 |
| 2002/0095606 A1* | 7/2002 | Carlton | 713/201 |
| 2002/0120565 A1* | 8/2002 | Yu et al. | 705/40 |
| 2002/0161717 A1* | 10/2002 | Kassan et al. | 705/59 |
| 2003/0037178 A1* | 2/2003 | Vessey et al. | 709/319 |
| 2003/0061067 A1* | 3/2003 | Atwal et al. | 705/1 |
| 2003/0079013 A1* | 4/2003 | I'Anson | 709/224 |
| 2003/0158884 A1* | 8/2003 | Alford, Jr. | 709/104 |
| 2003/0167329 A1* | 9/2003 | Kurakake et al. | 709/226 |
| 2004/0064411 A1* | 4/2004 | Tsui et al. | 705/40 |
| 2004/0068447 A1* | 4/2004 | Mao et al. | 705/27 |

OTHER PUBLICATIONS

Wang et al. "An integrated resource negotiation, pricing, and QoS Adaptation framework for multimedia applications", IEEE, 2000, pp. 1-15.*

"Changes to Workload License Charges Offer Additional Options and Price Advantages for Users of IBM eServer zSeries 800 and 900 Processors", IBM Corporation, Software announcement, Apr. 30, 2002, USA, pp. 1-14.

* cited by examiner

SYSTEM AND METHOD TO MONITOR AMOUNT OF USAGE OF APPLICATIONS IN LOGICAL PARTITIONS

BACKGROUND OF THE INVENTION

1. Field of Invention

The invention relates generally to computer systems, and deals more particularly with a technique to monitor an amount of usage of applications in logical partitions for billing or other purposes.

2. Description of Related Art

Computer systems are well known today, and comprise hardware and software components such as one or more processors, memory, storage, I/O devices to access storage, one or more operating systems and applications. Some types of computer systems are logically partitioned by a central operating system into separate, "logical" computers. A logical partition ("LPAR") can be the basis for a virtual machine or non virtual machine environment. Each logical partition comprises a share of the computer resources, and executes a guest operating system and application(s) using that share of the computer resources. For example, each logical partition may be given a periodic, time slice of the system's processor(s) to execute the operating system and application(s) within the logical partition. So, if a computer system is logically partitioned into ten logical computers, and each partition has an equal share of computer resources, then each logical partition can be executed on the processor(s) ten milliseconds every hundred milliseconds. In this manner, the applications within each logical partition execute as if they have their own dedicated computer resources (although the applications may be dormant ninety percent of the time). Alternately, if there are multiple processors in the system, each logical partition can have some of the processors dedicated to it.

The "share" of system resources for each logical partition is generally specified by a systems administrator during or before Initial Micro code Load ("IML") (but, in some cases, can be changed dynamically without IML), and this is based on an estimate of the relative needs of all the logical partitions for the finite computer resources. However, the specified share of computer resources for a logical partition may be greater (or lesser) at times than actually needed. For example, assuming the application(s) in the logical partition handle user requests, the frequency of the user requests may vary from time to time. During times of fewer requests, the applications in the logical partition may not need the entire share of hardware resources allocated to it. So, the logical partition may begin to execute during its allocated time slice, but complete its outstanding requests before the end of the time slice. In such a case, the operating system in the logical partition will notify the central operating system to suspend its execution for the remainder of the time slice. Then, the next logical partition in the sequence will immediately begin its time slice (earlier than scheduled), as will the subsequent logical partitions in the sequence. If the other logical partitions use their entire allocated time slice, then the actual share of processor time used by the one logical partition with the fewer user requests will be less than the specified share. In the case where the logical partition has more requests than can be handled in the specified share of processor time, there is not ordinarily any automatic upgrade to the allocated share of computer resources. Instead, the users and/or systems administrator may notice a slow operation for the applications in the logical partition, and the systems administrator can then adjust the specified share for the logical partition, reconfigure the logical partitions or take other action.

There are different reasons for logical partitioning. One reason is to isolate the applications in one logical partition from the applications in the other logical partitions. For example, different users can have their applications run in different logical partitions for improved reliability, security, availability, maintainability, etc. Another reason is for billing purposes. Today customers purchase computer systems with greater capacity than is required. This is done in anticipation of future peak computing demands. Customers initially register and enable some but not all of their system's Central Processors (CPs). They are then billed based on the number of CPs that are enabled, i.e. the enabled computing capacity. When customers need additional computing power (at least on a peak basis), they may register and pay for more CPs.

It was known for the computer hardware and system operating system to track and record in a system log which LPAR is currently executing and on which processor(s). The LPAR usage information was subsequently used to compute the amount of processor usage by each logical partition per hour, and therefore, whether each LPAR has the proper processor capacity. The LPAR usage information and computation of processor usage were also sent to a systems administrator.

It was also known for a guest operating system in each LPAR to track when each application begins execution and ceases execution, as "binary application indicator" information. (It was also known for another guest operating system to measure the time that each application is dispatched.) The "binary application indicator" information indicates whether the respective application ran at any time during the previous sampling period. The guest operating system recorded this binary application indicator information in storage private to the LPAR. It was also known for the guest operating system in each LPAR to track overall resource consumption in a sampling period, i.e. the amount of service unites consumed by all program functions (i.e. guest operating system, applications, etc.) in the LPAR during the sampling period. The guest operating system recorded this resource consumption information in storage private to the LPAR. A prior art software-based reporting system cross-referenced/compiled the application indicator information for the respective LPAR and the corresponding LPAR resource consumption information. This cross referencing/compiling produces a report which indicates how many service units were used by all the LPARs that executed each application during the previous sampling period. If two applications ran in an LPAR, then each application was charged for the overall resource consumption of the entire LPAR. This report was then used to determine an amount to charge the customer for the usage of each application. Customers then manually submit the cross referencing reports to the owner of the applications. These reports are input to an auditing and pricing application in a remote work station of the owner. While the foregoing process for a software-based reporting system was effective, it required that (a) the guest operating system in each LPAR track when each application begins and ceases execution, (b) the guest operating system in each LPAR track overall resource consumption of the LPAR and (c) the software-based reporting system cross reference data from each LPAR. This was burdensome to the systems administrator because there can be many LPARs in each system. Also, some reports are susceptible to customer tampering.

An object of the present invention is to provide a less burdensome technique to monitor and report usage of individual applications in an LPAR.

Another object of the present invention is to provide a technique to confirm the foregoing usage report for auditing or other purposes.

SUMMARY OF THE PRESENT INVENTION

The invention resides in a system, method and program product for determining an amount of usage of applications in an LPAR in a computer system and a bill for such usage. A guest operating system executes in the LPAR. The guest operating system dispatches a plurality of applications in the LPAR. The guest operating system or other program executing in the LPAR determines information indicative of an amount of usage of each of the applications. Based on the information, an amount of usage of each of the applications is reported to a billing function. The billing function determines a bill for each of the applications based on the amount of usage of each of the applications.

According to one feature of the present invention, the guest operating system writes the information indicative of the amount of usage of each of the applications to storage shared by the LPAR and system functions. A system function reads the information from the shared storage and reports information indicative of an amount of usage of each of the applications to the billing function.

According to another feature of the present invention, an amount of usage of the LPAR is determined based on system data, without using application usage information determined by the guest operating system or the other program in the LPAR. The total usage of all of the applications in the LPAR is determined based on the information determined by the guest operating system or the other program in the LPAR. The total usage of all of the applications is compared to an amount of usage of the LPAR based on the system data, to audit the amount of usage of the applications in the LPAR or a charge based on the amount of usage of the applications.

DETAILED DESCRIPTION OF THE PREFERRED EMBODIMENTS

Figure 1:
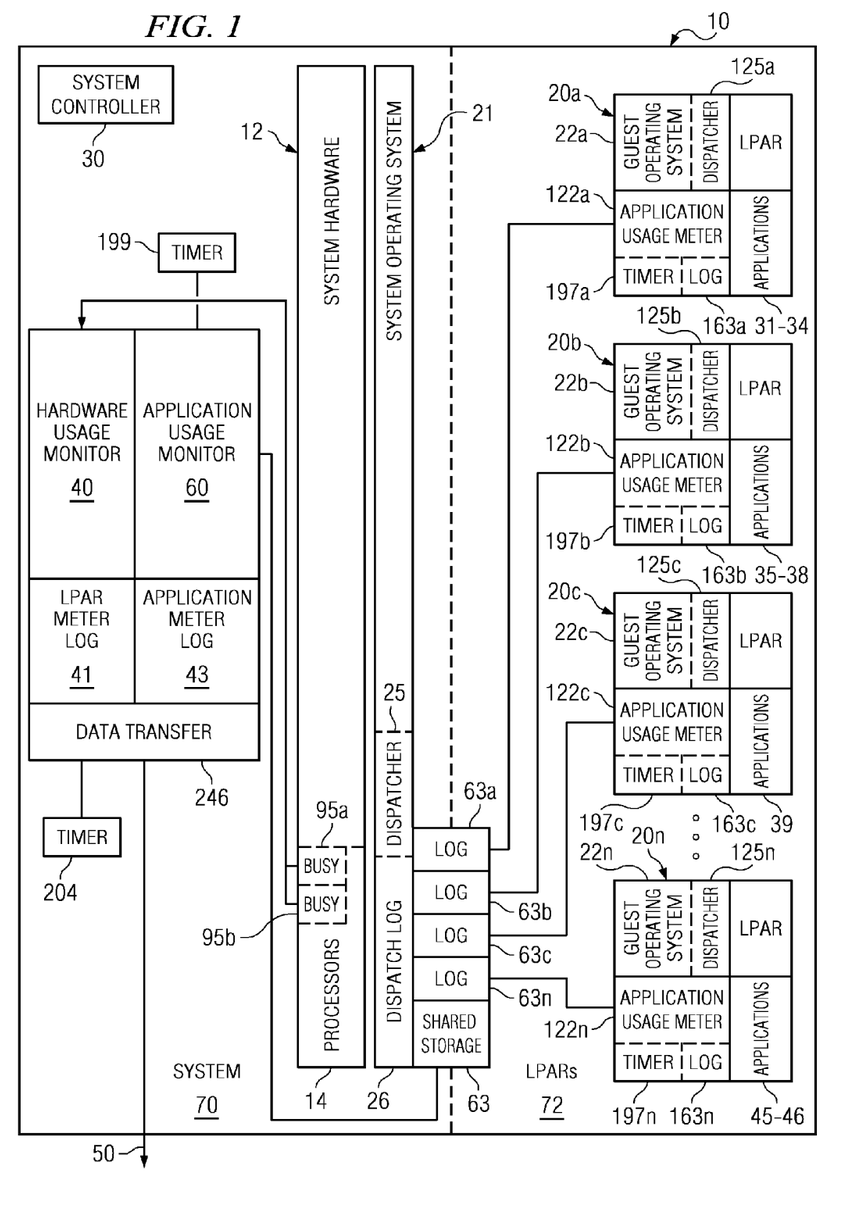
FIG. 1 is a block diagram of a computer system according to the present invention.

Referring now to the drawings in detail, wherein like reference numbers indicate like elements throughout, FIG. 1 illustrates a computer system generally designated 10 in accordance with one embodiment of the present invention. System 10 comprises computer hardware 12 including a plurality of processors 14, memory, (disk) storage, and I/O devices. (Alternately, there can be a single processor in computer hardware 12 instead of the plurality of processors.) A system operating system 21 has logically divided system 10 into a multiplicity of LPARs $20a,b,c \ldots n$. Guest operating systems $22a,b,c \ldots n$ run in LPARs $20a,b,c \ldots n$, respectively, and one or more applications run on each guest operating system in each logical partition. In the illustrated example, applications 31-34, 35-38, 39 . . . 45-46 run on guest operating systems $22a,b,c \ldots n$ in LPARs $20a,b,c \ldots n$, respectively. System 10 is logically divided into a "system portion" 70 and an "LPAR portion" 72. The system portion executes system functions such as system operating system 21, hardware usage monitor 40, application usage monitor 60, data transfer function 246 and system controller 30. The LPAR portion executes LPARS $20a,b,c \ldots n$. Shared storage 63 is an interface between the system portion 70 and the LPAR portion 72.

Each logical partition of hardware resources supports execution of the respective guest operating system and applications similar to how an operating system and its applications run in a dedicated computer. Each logical partition $20a,b,c \ldots n$ has respective private storage to store the respective guest operating system $22a,b,c \ldots n$, application usage meter $122a,b,c \ldots n$, respective applications and any associated data. Each logical partition $20a,b,c \ldots n$ also has access to a respective log $63a,b,c \ldots n$ in storage shared with the system operating system 21. Thus, logical partition $20a$ and the system operating system 21 can both write to and read from log $63a$, logical partition $20b$ and the system operating system 21 can both write to and read from log $63b$, logical partition $20c$ and the system operating system 21 can both write to and read from log $63c$, and . . . logical partition $20n$ and the system operating system 21 can both write to and read from log $63n$.

A systems administrator or a user, acting through a system controller 30 interface, can specify a nominal share of the execution capacity/time of processors 14 for each LPAR. Alternately, the systems administrator or user can specify the number of processors employed for each LPAR. The guest operating systems $22a,b,c \ldots n$ may be the same or different than each other, and by way of example, can be IBM z/OS, IBM z/VM, Linux (tm of Linus Torvalds), UNIX, VSE, TPF, etc. The applications within each LPAR partition are generally different than each other. For example applications 31-34 in LPAR $20a$ can be IBM DB2, IBM Web Sphere, IBM MQSeries, Oracle, BEA, SAP, etc.

When the LPARs are allocated a share of the capacity/time of the system's processor(s) 14, the system operating system 21 (called "Hypervisor" in IBM zSeries servers) allocates time slices of the processor(s) 14 to each LPAR according to its specified share. For example, if LPAR $20a$ has been allocated a ten percent share of total processor time, then system operating system 21 may schedule to execute LPAR $20(a)$ ten milliseconds every hundred milliseconds. This is just an example, as the specified share of processor time for each LPAR can be satisfied with different arrangements. A dispatcher 25 in system operating system 21 dispatches each LPAR according to its share of processor time, and selects the processor(s) on which each LPAR should execute. System operating system 21 records in a log 26 which LPAR has been dispatched, how long the LPAR executed, and on what processor(s) the LPAR was executed. Log 26 resides in system memory not accessible to the LPARs. An LPAR may relinquish its use of the allocated processor time slice before the end of the allocated time slice if the applications in the LPAR do not have sufficient tasks/workload to fill the entire time slice.

Figure 2:
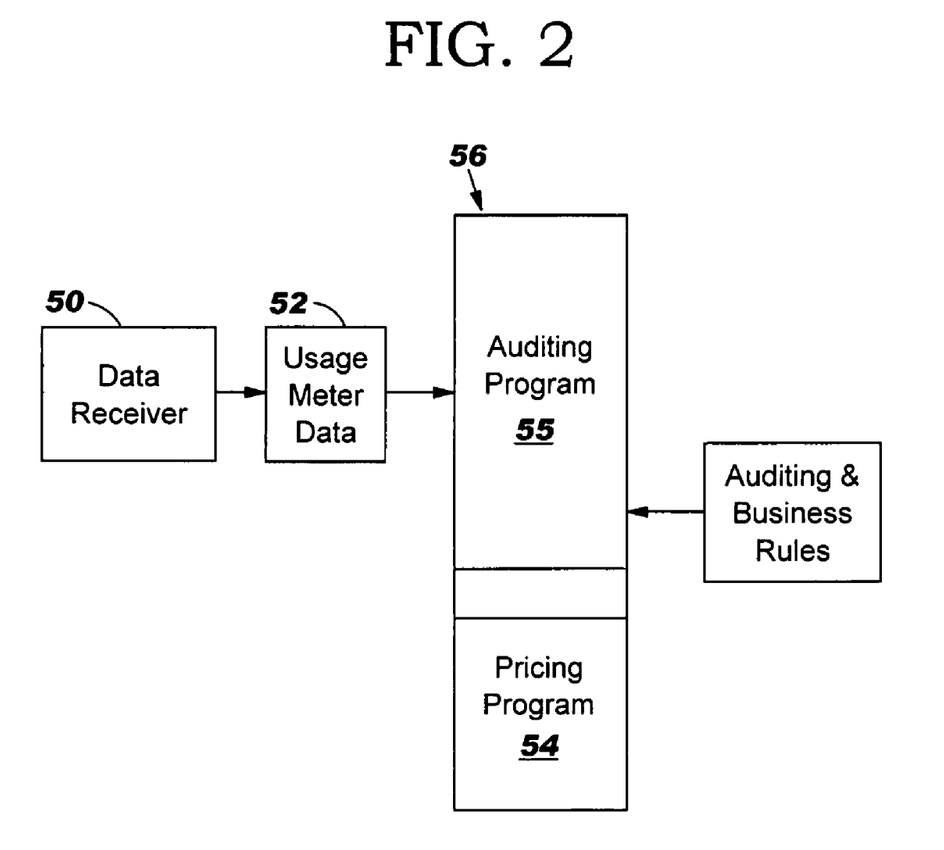
FIG. 2 is a block diagram of a auditing work station for the computer system of FIG. 1, according to the present invention.

A prior art hardware usage monitor 40 within the hardware 12 and/or system operating system 21 tracks and records in system log 41 which LPARs are currently executing and on which processor(s). This LPAR usage information is periodically sent to a remote data receiver 50 and then stored in storage 52 of auditing work station 56. The LPAR usage information from hardware usage monitor 40 is used to audit application usage information from application usage monitor 60 as follows. As noted above, there can be multiple applications in each LPAR. Each of the guest operating systems $22a,b,c \ldots n$ within the respective LPAR $20a,b,c \ldots n$ includes a prior art dispatcher $125a,b,c \ldots n$ to dispatch the respective applications (based on round robin, priority levels, application need or other dispatch algorithm). In the case where each LPAR has a share of the capacity/time of processors 14, this dispatching only occurs when the LPAR has its time slice of the processors 14. (At other times, the operating systems $22a,b,c \ldots n$ and their respective applications are dormant.) The dispatcher $125a,b,c \ldots n$ dispatches the applications continuously, as long as there is work to do. When each guest operating system $22a,b,c \ldots n$ dispatches one of its applications, a prior art function within the guest operating system determines the execution time of the application. In accordance with the present invention, the guest operating system then records the execution time of each application in a respective log $63a,b,c \ldots$ or n in shared storage, so the application usage monitor 60 in or associated with system operating system 21 can read it. The application usage monitor 60 processes and periodically reports the application usage information to the data receiver 50 to be written in storage 52. An auditing function 55 within auditing work station 56 confirms the application usage information by summing together the application usage information for all the applications in each LPAR and compares the sum to the LPAR usage information generated by the hardware usage monitor 40 for the respective LPAR. If the two calculations are similar, then an application pricing function 54 at work station 56 determines a bill for the customer for each application based on this application usage information.

Figure 3:
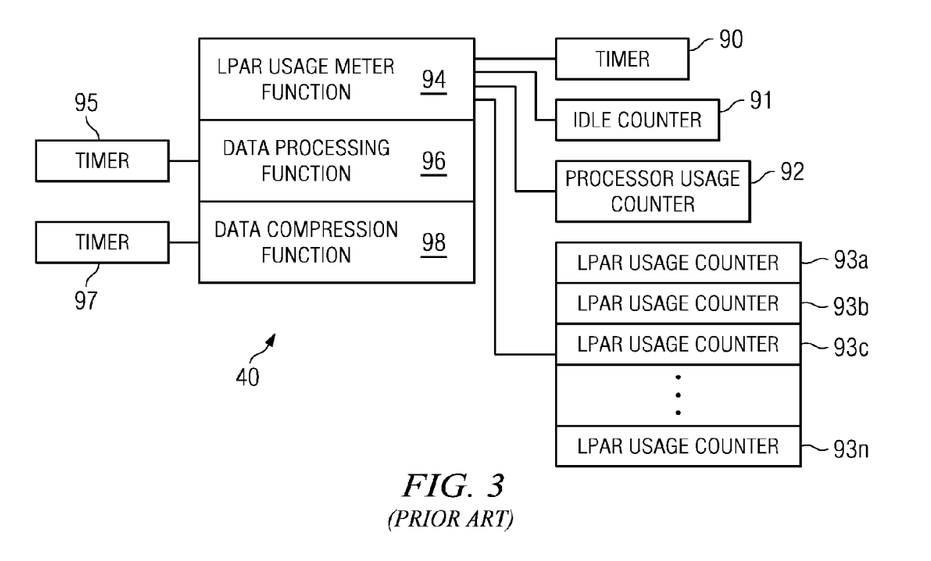
FIG. 3 is a more detailed block diagram of a hardware usage monitor of the computer system of FIG. 1.

FIG. 3 is a more detailed illustration of the prior art hardware usage monitor 40. Hardware usage monitor 40 comprises a relatively short timer 90, a set of idle counters 91 (one for each processor), a set of processor usage counters 92 (one for each processor), a set of LPAR usage counters $93a,b,c \ldots n$ (one for each LPAR), an LPAR usage meter function 94, a longer timer 95 and an associated data processing function 96, and a still longer timer 97 and an associated data compression function 98. Functions 94, 96 and 98 can be implemented in software, microcode or hardware.

Figure 4:
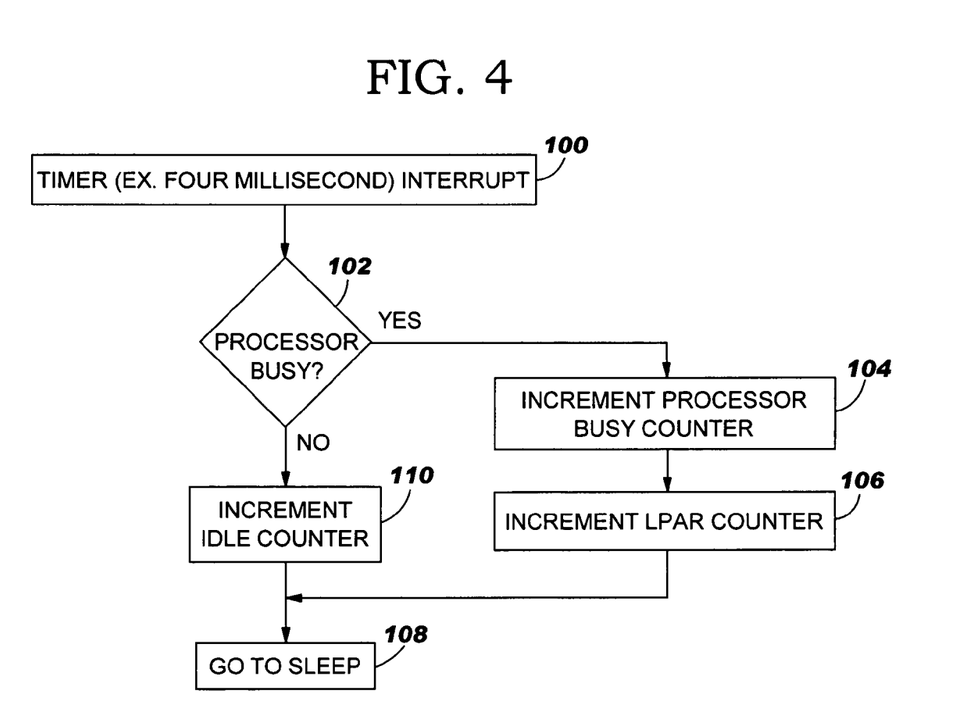
FIG. 4 is a flow chart illustrating a hardware usage meter within a system operating system of FIG. 1.

FIG. 4 is a flow chart illustrating LPAR usage meter function 94 within hardware monitor 40. The steps of FIG. 4 are repeated for each processor in the system 10. In step 100, the timer 90 elapses and causes an interrupt to LPAR usage monitor 40. In response, the LPAR usage meter function 94 determines if the processor under test is busy (step 102). This determination is made by checking a bit $95a,b$., on or associated with the processor, indicating whether the processor is currently in use. If so, the LPAR usage meter function 94 increments the processor usage counter 92 for this processor (step 104). Also, the LPAR usage meter function 94 increments the LPAR usage counter $93a,b,c \ldots$ or n for the LPAR that is currently executing (step 106). As explained in more detail below, the LPAR usage counters are used in the calculation of LPAR utilization. Referring again to decision 102, if none of the processors 14 is busy when sampled, then the LPAR usage meter function increments the idle counter 91 (step 110). The sample interval of short timer 90 (for example four milliseconds) is short enough compared to the processor time slices to adequately sample the processor time slices. Theoretically, the sampling should occur at least twice for every time slice duration. After step 110 or 106, the LPAR usage meter function goes to sleep until the timer 90 elapses again (step 108).

Figure 5:
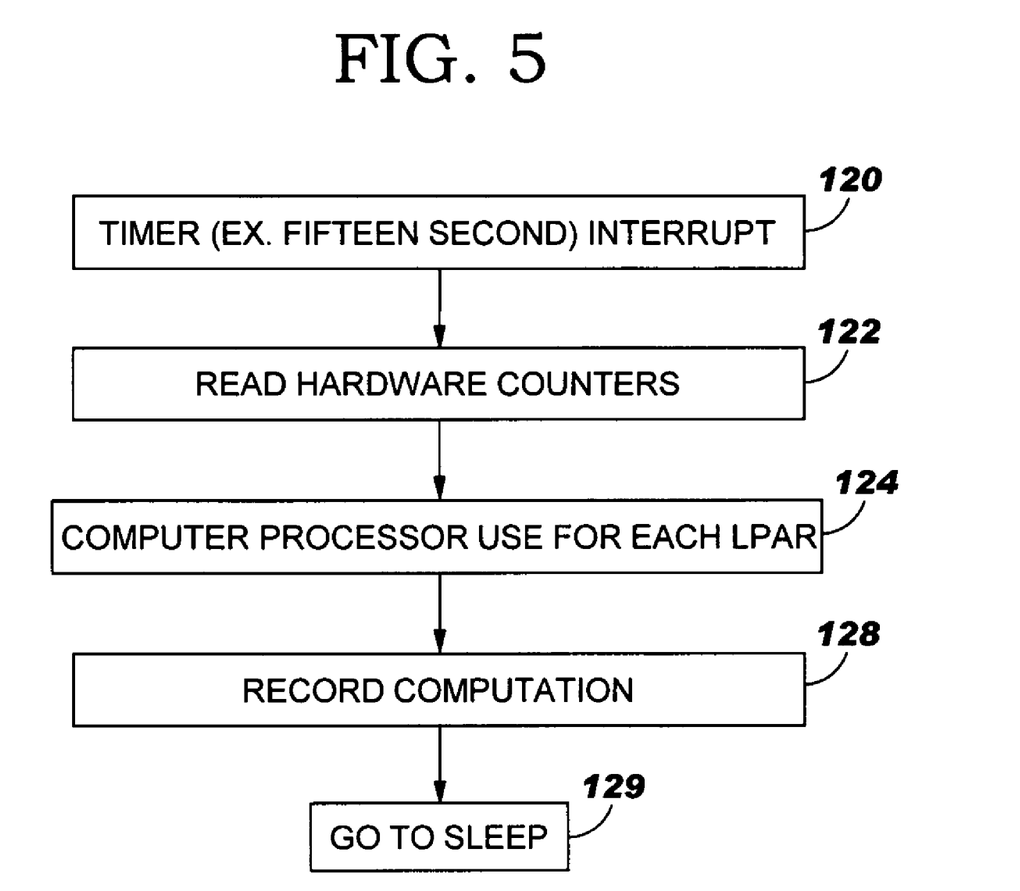
FIG. 5 is a flow chart illustrating a data processing function within the hardware usage monitor of the system operating system of FIG. 3.

FIG. 5 is a flow chart illustrating a data processing function 96 within the hardware usage monitor 40. In step 120, timer 95 (for example fifteen seconds) elapses and causes an interrupt to hardware usage monitor 40. In response, the data processing function 96 reads the counters 91, 92 and 93 (step 122). Then, the data processing function calculates the processor time usage of each LPAR based on the following two equations (step 124):

> LPAR Activity for Each Processor=(Counter 92/Counter 92+Counter 91)×(Respective Counter 93a,b,c . . . or n/Sum of All Counters 93a,b,c . . . n)×100. This calculation is repeated for each LPAR.

> LPAR Activity for All Processors=Sum the LPAR Activity for Each Processor/Number of Processors. This calculation is repeated for each LPAR.

Next, the data processing function 96 stores the results calculated above (step 128), and then goes to sleep until the timer 95 elapses again.

Figure 6:
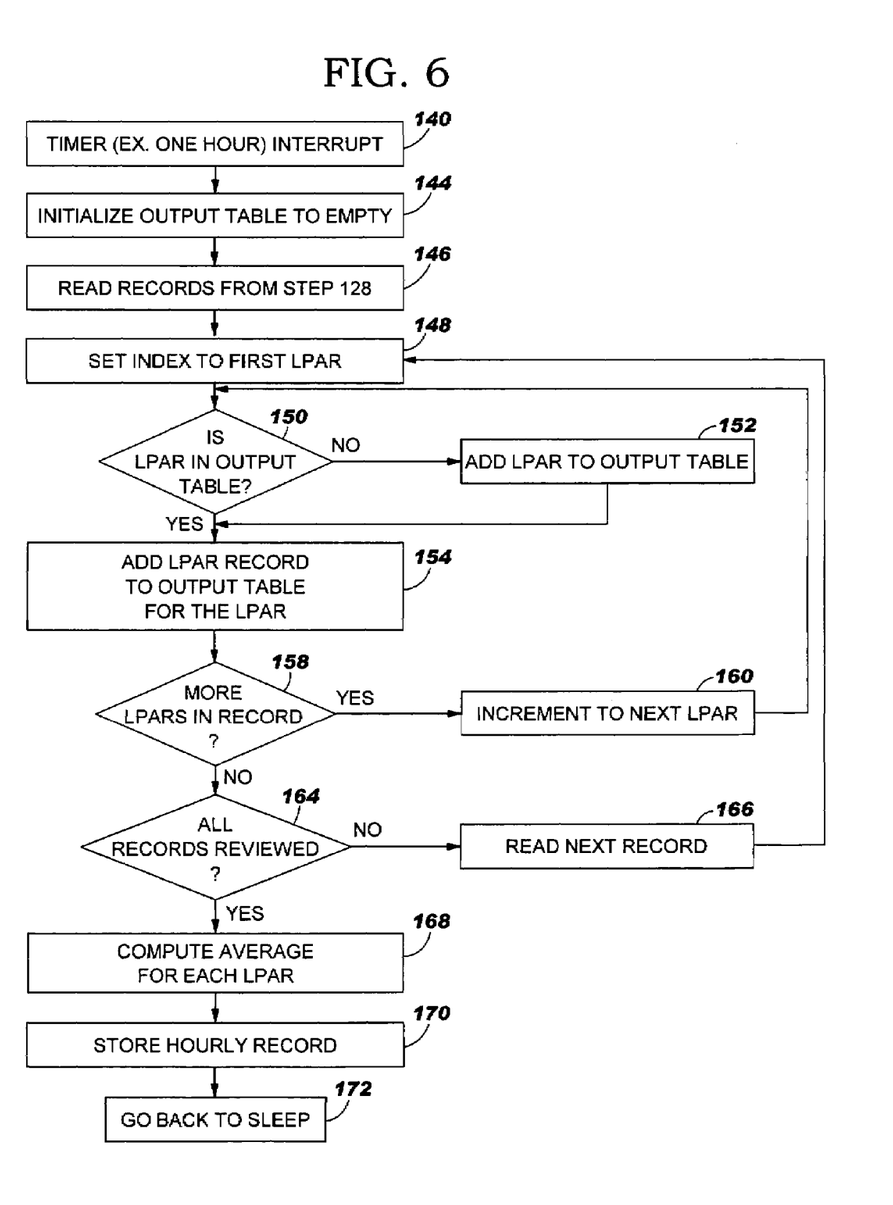
FIG. 6 is a flow chart illustrating a data compression function within the hardware usage monitor of FIG. 3.

FIG. 6 is a flow chart illustrating the data compression function 98 within the hardware usage monitor 40. In step 140, the timer 97 elapses which causes an interrupt to be sent to the hardware usage monitor 40. In response, data compression function 98 initializes an output table to empty (step 144), and then reads the first or next compressed results for the "LPAR Activity for All Processors" calculated above for all LPARs for one timer 97 sampling (step 146). Next, data compression function 98 sets an index to correspond to a first one of the LPARs (step 148). Then, the data compression function 98 100 determines if this LPAR is in the output table (decision 150). If not, the data compression function adds this LPAR to the output table (step 152). If so or after step 152, the data compression function 98 adds the calculation for this LPAR to the table (step 154). Next, if there are additional LPAR calculations yet to be processed by the data compression function 98 (decision 158), then the data compression function 98 increments to the next LPAR (step 160), and returns to step 150 148 as described above. After the calculations for all the LPARs have been added to the output table (decision 158), the data compression function determines if there is another set of results for the "LPAR Activity for All Processors" calculated above for another timer 97 sampling (decision 164). If so, in step 166, the data transfer compression 98 returns to step 148 to repeat the foregoing process for the results from this sampling. If not, the data compression function 98 computes the average processor time utilization for each LPAR based on the following equation (step 168):

Total Processor Utilization for LPAR/Number of timer 97 samplings.

Finally, the data compression function stores the average processor time utilization into the LPAR meter log 41 (step 170), and then goes to sleep until timer 97 elapses again (step 172).

Figure 7:
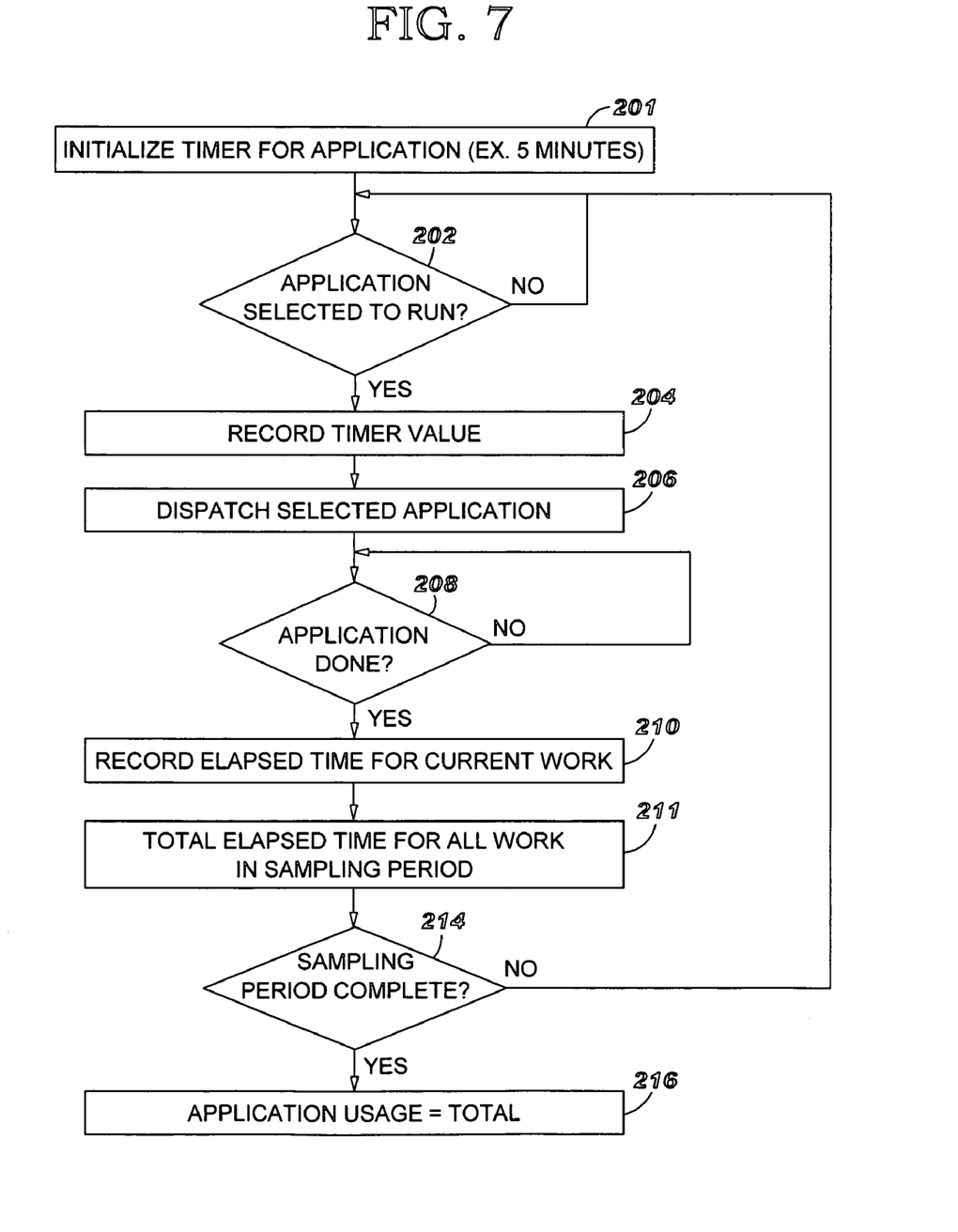
FIG. 7 is a flow chart illustrating an application usage metering function within a guest operating system of FIG. 1.

FIG. 7 is a flow chart illustrating application usage meter function 122a,b,c . . . n within each guest operating system 22a,b,c . . . n, respectively. In step 201, the guest operating system initializes a respective timer 197a,b,c . . . n for each LPAR (for example five minutes). (Even though the application usage meter function in each LPAR will record execution time of each application in the LPAR, because the applications execute serially, one timer in each LPAR can be used by all the applications in the same LPAR.) The timer is of a nature which decrements, and the initial value is high enough never to go to zero during the entire sampling period, for example one hour. Next, the guest operating system decides to dispatch one of the applications in the LPAR based on round robin, priority levels or other dispatching algorithm (decision 202). In one embodiment of the present invention, the application usage meter function 122a,b,c . . . n within the respective guest operating system 22a,b,c . . . n records the current timer value in the respective log 63a,b,c . . . or n in shared storage (step 204), and then dispatches the application (step 206). When the application completes it current work (decision 208), the application usage meter function records the current timer value in the respective log 63a,b,c . . . or n, and then computes the difference between the current timer value and the timer value set when the application began its current work to determine the execution time for the current work (step 210). The application usage meter function also totals the execution time for the current work to the previous total, if any, for prior work for this application during the same sampling period and records the total in the respective log 63a,b,c . . . n (step 211). The application usage meter function repeats the foregoing steps 202-211 for the entire sampling period (decision 214).

Alternately, steps 204-211 can be performed as follows in a second embodiment of the usage meter function. The application usage meter function 122a,b,c . . . n within the guest operating system 22a,b,c . . . n records the current timer value in a respective log 163a,b,c . . . or n in private storage of the respective LPAR 20a,b,c . . . n (step 204), and then dispatches the application (step 206). When the application completes it current work (decision 208), the application usage meter function 122a,b,c . . . n records the current timer value in the respective log 163a,b,c . . . or n in its private storage, and then computes the difference between the current timer value and the timer value set when the application began its current work to determine the execution time for the current work (step 210). The application usage meter function 122a,b,c . . . n also totals the execution time for the current work to the previous total, if any, for prior work for this application during the same sampling period and then records the total in the respective log 63a,b,c . . . n in shared storage (step 211). In either embodiment of steps 204-216, when the sampling period is complete, in the respective log 63a,b,c . . . n, there is stored a total of the execution time of each application during the sampling period.

Figure 8:
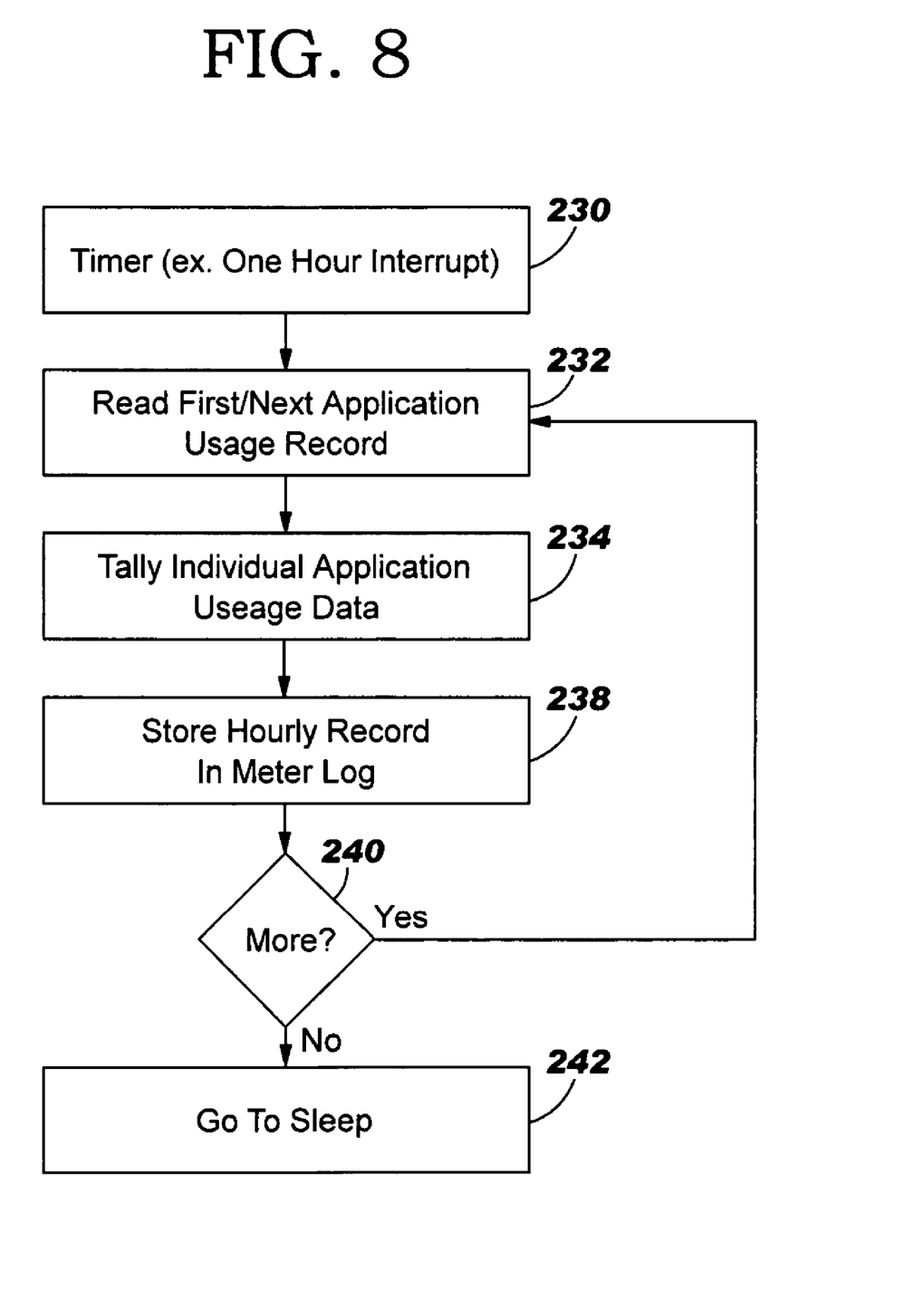
FIG. 8 is a flow chart illustrating an application usage monitor within the system operating system of FIG. 1.

FIG. 8 illustrates the application usage monitor 60 in or associated with the system operating system 21. In step 230, timer 199 (for example, one hour) elapses which causes an interrupt to be sent to the application usage monitor 60. In response, the application usage monitor 60 collects an application usage data record from one of the logs 63a,b,c . . . n (step 232). As explained above, there is a record for each application indicating the total elapsed time that the application executed during all dispatches in the relatively short time period (for example, five minutes). Next, application monitor 60 sums the usage time records for each application during the relatively long time period (step 234) and stores the sum in application usage log 43 (step 238). If there are more records in this log 63a,b,c . . . n, or records from another log 63a,b,c . . . n (step 240), then steps 232, 234 and 238 are repeated for each other record. At the conclusion of steps 230-240, the application usage monitor 60 has a tally of the total execution time of each application during the sampling interval (for example, one hour). For example, if the sampling interval is one hour, application 31 may have executed for ten minutes, application 32 may have executed for twelve minutes, application 33 may have executed for eleven minutes and application 34 may have executed for eighteen minutes. Then, application usage monitor 60 goes to sleep until the next sampling interrupt (step 242).

Figure 9:
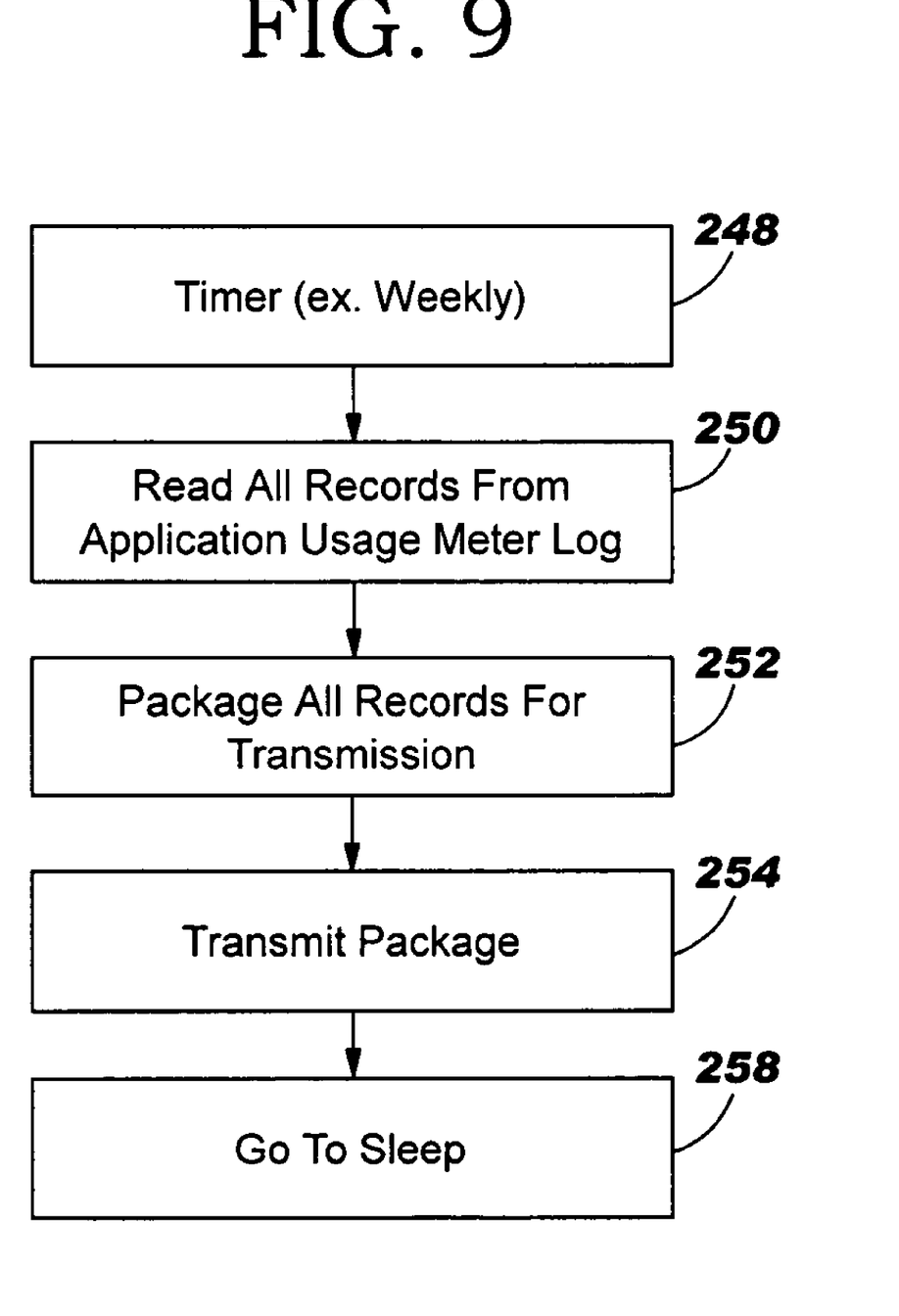
FIG. 9 is a flow chart illustrating a data transfer function within the system operating system of FIG. 1 associated with both the hardware usage monitor and the application usage monitor.

FIG. 9 illustrates a data transfer function 246 within or associated with the system operating system 21, hardware usage monitor 40 and application usage monitor 60. Upon expiration of timer 204 (for example, weekly) (step 248), the data transfer function 246 reads the LPAR usage data from the LPAR usage meter log 41 and the application usage data from the application usage meter log 43 (step 250), packages the data (step 252), and transmits the packages to data receiver 50 (step 254). Then, data transfer function 204 goes to sleep until the next timer interrupt (step 258).

Figure 10:
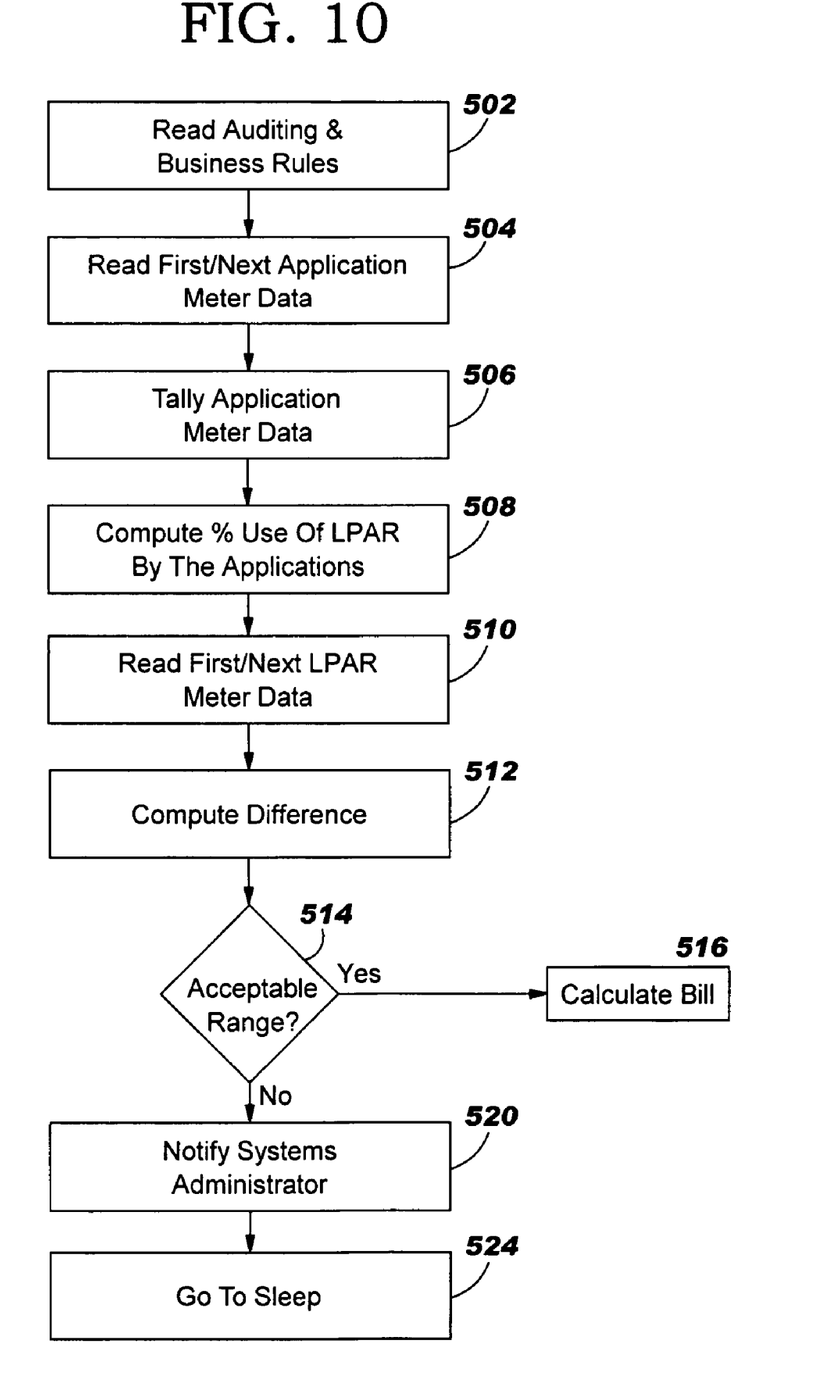
FIG. 10 is a flow chart illustrating an auditing program and a pricing program within the workstation of FIG. 2.

FIG. 10 is a flow chart illustrating auditing program 55. In step 502, the auditing program 55 reads auditing and business rules previously entered by a systems administrator. The auditing and business rules specify the identity of the system to be audited, the amount of deviation that will be tolerated between the charges calculated by the hardware usage monitor data and the application usage monitor data, and the action to be taken when the deviation is excessive. Next, the auditing program adds together the usage of all applications in each LPAR from the application usage data recorded in storage 52 (steps 504 and 506). From this summation, the auditing program computes the percentage utilization of each LPAR based on the following equation (step 508):

*LPAR* UTILIZATION=(Actual *LPAR* Usage)×(# Dedicated Processors For *LPAR* or Specified Processor Share For *LPAR*×Total Number of Processors)

Next, the auditing program reads the corresponding LPAR usage data from the LPAR usage meter data for each LPAR (step 510). Next, the auditing program subtracts the LPAR usage data derived from the LPAR usage meter from the LPAR usage calculated in step 508 for each LPAR (step 512). If the difference is within an acceptable range (step 514), then the auditing program can invoke a pricing program 54 at the auditing workstation 56 to compute a bill for the customer for each application. The bill can be computed by multiplying the total usage of each application for the month times the unit application charge. Alternately, the bill can be based on a peak usage (ex. four hour rolling average) for each application during the month. Referring again to decision 514, if the difference is not within an acceptable range, then an alarm is sent to the systems administrator who may manually review the data or look for some other problem (step 520). Then, the auditing program goes to sleep until the next interval interrupt (step 522).

Based on the foregoing, a technique has been disclosed to (a) monitor the amount of usage of each application based on usage data furnished by a guest operating system in each LPAR to the system operating system, and then (b) audit the foregoing amount of application usage based on system measurements of LPAR usage. However, numerous modifications and substitutions can be made without deviating from the scope of the present invention. For example, there is a third embodiment of the application usage meter function 122a,b,c . . . n within each guest operating system 22a,b,c . . . n. In this third embodiment, the application usage meter function 122a,b,c . . . n within the guest operating system 22a,b,c . . . n, after selecting an application for dispatch, records the current timer value in a respective log 163a,b,c . . . or n in private storage of the respective LPAR 20a,b,c . . . n (step 204), and then dispatches the application (step 206). When the application completes it current work (decision 208), the application usage meter function 122a,b,c . . . n records the current timer value in the respective log 163a,b,c . . . or n in its private storage, and then computes the difference between the current timer value and the timer value set when the application began its current work to determine the execution time for the current work (step 210). The application usage meter function 122a,b,c . . . n also totals the execution time for the current work to the previous total, if any, for prior work for this application during the same sampling period and then records the total in the respective log 163a,b,c . . . n in its private storage (step 211). In this third embodiment, the application usage monitor 60 performs the same function as described above, but is executed as an application in each LPAR. The results generated by the application usage monitor 60 as described above indicating usage of each application are recorded in the respective log 163a,b,c . . . n within private storage of the LPAR, and then transferred from the LPAR to the data receiver 50 for processing by the auditing program 55 and pricing program 54 as described above. Therefore, the invention has been disclosed by way of illustration and not limitation, and reference should be made to the following claims to determine the scope of the present invention.

The invention claimed is:

1. A method for determining an amount of usage of applications in a logical partition in a computer system and a bill for such usage, said method comprising:

executing a guest operating system in said logical partition;

said guest operating system dispatching a plurality of applications in said logical partition;

said guest operating system or other program executing in said logical partition determining information indicative of an amount of usage of each of said applications;

determining a total usage of all of said applications in said logical partition based on said information indicative of said amount of usage of each of said applications determined by said guest operating system or said other program;

determining, by a hardware usage monitor, logical partition usage information for hardware resources used by the logical partition;

based on said information, reporting said amount of usage of each of said applications to a billing function; and comparing said total usage of all of said applications to an amount of usage of hardware resources by said logical partition to audit said amount of usage of said applications in said logical partition or a charge based on said amount of usage of said applications;

said billing function determining a bill for each of said applications based on said amount of usage of each of said applications and said logical partition usage of hardware resources.

2. A method as set forth in claim 1 further comprising:

determining said amount of usage of each of said applications based on said information determined by said guest operating system or said other program executing in said logical partition; and reporting said amount of usage of each of said applications.

3. A method for determining an amount of usage of applications in a logical partition in a computer system and a bill for such usage, said computer system including storage private to said logical partition, storage private to said system and system functions, and storage shared by said logical partition and said system functions, said method comprising:

executing a guest operating system in said logical partition;

said guest operating system dispatching a plurality of applications in said logical partition, determining information indicative of an amount of usage of each of said applications, and writing said information indicative of said amount of usage to said shared storage;

determining a total usage of all of said applications in said logical partition based on said information indicative of an amount of usage from said shared storage;

determining, by a hardware usage monitor, logical partition usage information for hardware resources used by the logical partition;

one of said system functions reading said information indicative of said amount of usage of each of said applications from said shared storage and reporting said amount of usage of each of said applications to a billing function;

comparing said total usage of all of said applications to an amount of usage of hardware resources by said logical partition to audit said amount of usage of said applications in said logical partition or a charge based on said amount of usage of said applications; and said billing function determining a bill for each of said applications based on the information obtained from said one system function and the logical partition hardware resources usage information.

4. A method as set forth in claim 3 wherein said guest operating system determines the amount of usage of each of said applications and reports the amount of usage of each of said applications to said shared storage.

5. A method as set forth in claim 3 wherein said guest operating system calculates the amount of usage of each of said applications using storage private to said logical partition, and then reports the amount of usage to said shared storage.

6. A method as set forth in claim 3 wherein said one system function processes said information obtained from said shared storage into a different form, and then reports said information in said different form to said billing function.

7. A method as set forth in claim 3 further:

determining an amount of usage of said logical partition without using application usage information generated by said guest operating system.

8. A method as set forth in claim 7 wherein the step of determining said amount of usage of said logical partition based on said system data is performed by checking usage bits of processors which execute said logical partition.

9. A method as set forth in claim 3 wherein said bill is based on a peak usage.

10. A method as set forth in claim 3 wherein said determining said amount of usage of said logical partition is performed by checking usage bits of processors which execute said logical partition.

11. A method as set forth in claim 3 wherein another of said system functions determining said amount of usage of said logical partition without using application usage information generated by said guest operating system comprises:

computing percent utilization of said logical partition as said logical partition utilization=(actual logical partition usage)×(number of dedicated processors for logical partition or specified processor share for said logical partition×total number of processors).

12. A method as set forth in claim 3, wherein said comparing said total usage of all of said applications in said logical partition to said amount of usage of said logical partition to audit said amount of usage of said applications in said logical partition, comprises:

reading auditing and business rules;

adding a usage of said applications for said logical partition;

computing percent utilization of said logical partition to form said usage of said logical partition;

reading logical partition usage data for said logical partition;

subtracting said logical partition usage data from said usage of said logical partition to form a difference;

determining whether said difference is within an acceptable range; and if the difference is within said acceptable range, computing a bill.

\* \* \* \* \*

UNITED STATES PATENT AND TRADEMARK OFFICE
CERTIFICATE OF CORRECTION

PATENT NO. : 7,620,950 B2
APPLICATION NO. : 10/613779
DATED : November 17, 2009
INVENTOR(S) : Mathias et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1900 days.

Signed and Sealed this

Twenty-sixth Day of October, 2010

David J. Kappos
*Director of the United States Patent and Trademark Office*